May 7, 1940.  P. L'ORANGE  2,200,131

CONTINUOUSLY VARIABLE CHANGE-SPEED GEAR

Filed Dec. 23, 1938

INVENTOR:—
Prosper L'Orange
By Smith, Michael & Gardiner, Attys.

UNITED STATES PATENT OFFICE 2,200,131

CONTINUOUSLY VARIABLE CHANGE-SPEED GEAR

Prosper L'Orange, Stuttgart-Feuerbach, Germany; Rudolf L'Orange executor of the estate of said Prosper L'Orange, deceased Application December 23, 1938, Serial No. 247,527
In Germany April 5, 1937

11 Claims. (Cl. 74—191)

This invention relates to a continuously variable change-speed gear employing co-operating rotating friction elements, at least one of which has a conical surface, in which the axis of rotation of at least one of the friction elements is movable with a parallel motion in order to vary the relative proportions of the effective diameters of the elements and thus produce adjustment of the gear ratio.

With such an arrangement the parallel motion may be provided for by so mounting one of the said elements upon a pivoted arm as to undergo swinging movement with the said arm and also to be movable along its own axis of rotation, the two elements being maintained in driving contact by a radial force corresponding to the torque to be transmitted.

A form of such an arrangement is disclosed in the specification of German Patent No. 638,675, in which case the radial force by which contact is maintained between the friction elements is produced by reason of the fact that the drive is transmitted through an epicyclic gear, the planet wheel of which is mounted on the spindle of the axially adjustable friction element and is mounted on an arm pivotally movable about the axis of the sun wheel of the gear. With this construction, by suitably arranging the parts, the radial force is automatically maintained proportional to the torque.

Figure 1:
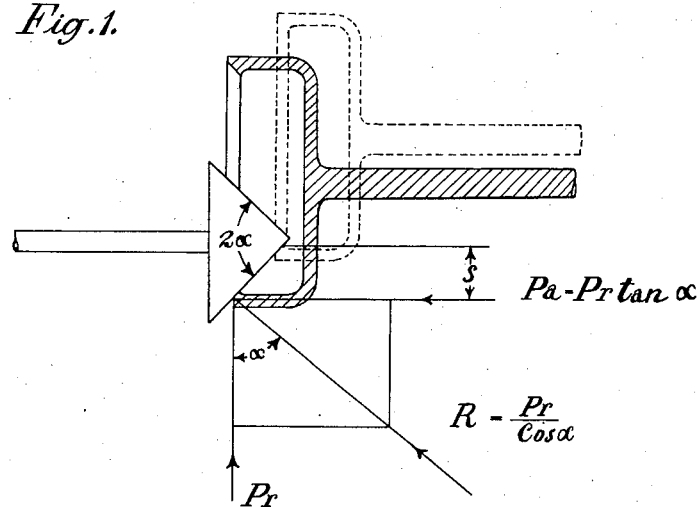
Figure 1 shows a single roller unit in longitudinal section with a force diagram applied thereto.

The general character of an arrangement to which the invention may be applied is illustrated in Figure 1 of the accompanying drawing, from which it can be seen that in order to effect the axial displacement an amount of work must be done which is equal to the product of the radial application force $P_r$ and the distance $s$, in the direction of the force, through which the point of contact of the friction elements moves during the axial displacement; that is, the work $A = P_r.s$.

Since the value of the radial application force is a multiple of the circumferential force and is thus, in practice, comparatively large, the work required for the axial displacement is too great to be supplied, for example by a regulator, in a short time.

An object of the present invention is to enable the required axial displacement to be effected whilst doing only a small amount of work. With this end in view, according to the invention, an axially acting force such as that indicated by the reference $P_a$ in Figure 1, is applied at the point of contact of the friction elements in addition to the radially acting force previously referred to. The value of the said axial force may be made variable with the torque, and it may be produced, for example, by a helical surface interposed between an axially movable friction element and its shaft.

The axial thrust $P_a$ is preferably made equal to $P_r.\tan \alpha$ when $\alpha$ is half the conical angle, and by suitably designing the means producing the axial force $P_a$, for example the helical surface, the said force can be maintained always equal to $P_r.\tan \alpha$. In this case, the resultant force $$R = \frac{P_a}{\cos \alpha}$$

and its direction is normal to the friction surface at the point of contact for the time being.

If now relative displacement of the friction elements takes place in a direction perpendicular to this normal, the distance moved by the point of contact in the direction of the resultant force R is zero and $s=0$. The work done in effecting the displacement is therefore theoretically zero, and can in practice be made very small, but in this connection it is of course advantageous to reduce as far as possible the frictional resistance of the moving parts.

Referring to the construction illustrated in full lines, the change-speed gear comprises a conical driving element A mounted on a driving shaft B. The element A engages the inner conical surface of a driven friction wheel C, in which, however, the friction surface is in the form of a narrow annulus, so that the radius of the wheel C at the point of contact always remains the same.

The friction wheel C is carried by a shaft J rotatably mounted in a planet wheel D which is rotatably carried in an arm E and engages a driven sun wheel F.

The friction wheel C carries a plurality of rollers G, G which are mounted on radial spindles and bear against helical surfaces H on the planet wheel D so that an axial thrust will be produced, the value of which will depend upon the positions of the rollers G on the surfaces H. The pitch of the said helical surfaces is so calculated that the axial thrust $P_a$ due to the moment M at any time is equal to $P_r.\tan \alpha$. As is known, however, $P_r$ is proportional to $$\frac{M}{N}$$

where R is the radius of the planet wheel.

The variation of the gear ratio could be effected by the axial displacement of the friction wheel A, as also by the axial displacement of the friction wheel C. In the construction illustrated, however, the arm E is arranged to be rotatable about the axis of the sun wheel F, and a pin L on the said arm is engaged by a rod K connected, for example, to a governor.

Figure 2:
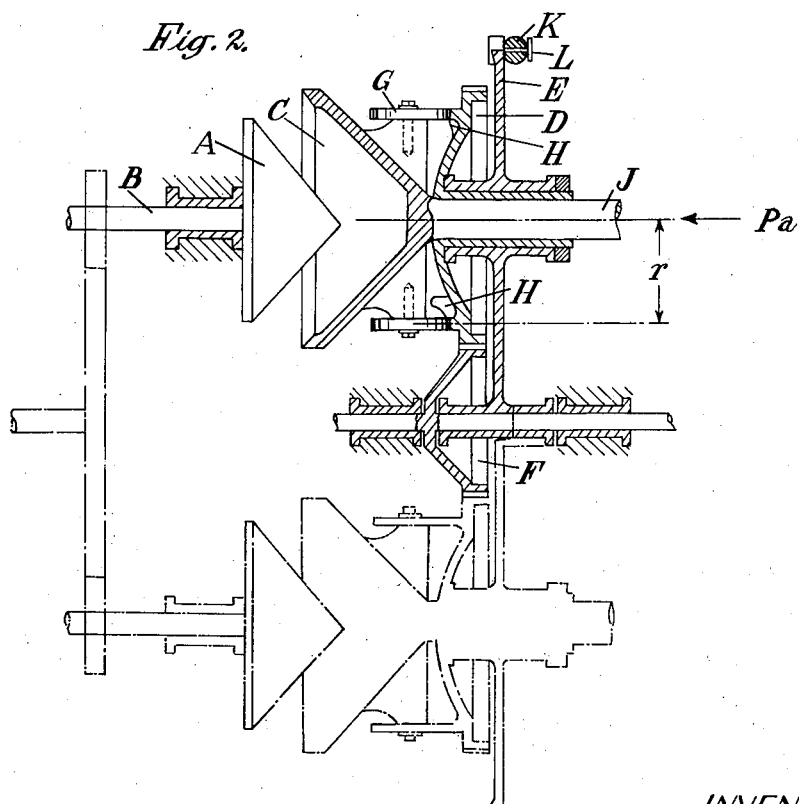
Figure 2 shows, in full lines, one constructional form of my invention in longitudinal section; and, in chain dotted lines, a diagrammatic illustration of one way in which additional units may be employed in a single transmission structure.

The manner of operation of the construction illustrated in Figure 2 is as follows:

When the drive commences, the friction wheel C is rotated by the driving friction member A. The planet wheel D then rolls over the sun wheel F until the resistance thereof is overcome, whereupon the sun wheel is rotated. At the same time a force $P_r$ is produced which acts on the friction wheel C and tends to force the latter perpendicularly to the plane of the drawing against the cone A. In the meantime, however, an axial thrust $P_a$ due to the helical surfaces H has become effective and combines with the radial force $P_r$ to produce a resultant force R normal to the coned surfaces, the force R, which offers no resistance to the adjustment thus constituting the force maintaining the pressure of the frictional engagement.

The frictional transmission can be initiated in known manner by light spring pressure, by gravity, or otherwise If the moment of the driven wheel has a constant value, the axial thrust can also be produced by a spring force of constant value, or by the use of inclined teeth between the sun and planet wheels D, F.

By employing the above-described construction, it is possible, as indicated in chain-dotted lines in Figure 2, to drive a plurality of friction wheels from the same input shaft, in which case each of the two or more sets of conical driving elements and driven friction wheels would be coupled with planet wheels, each conical driving element rotating about a fixed axis and each driven inner cone being axially and radially adjustable in the manner described. In a construction of this character the axes of the input and output shafts may coincide. If, however, a simple friction wheel drive were provided, without the introduction of an axial thrust of definite ratio to the radial force in accordance with the invention, the members of the separate friction wheel pairs would not all engage one another, since it would be impossible to make them with sufficient accuracy. By providing the combination of forces described, however, the arrangement is rendered practicable, since there would be a very small decrease of the radial force and a similar increase of the axial force applied to the members of a friction wheel pair leading the other pairs by a small amount. The result of this would merely be that an inappreciable variation of the angle of the resultant force would take place.

What I claim as my invention and desire to secure by Letters Patent of the United States is:

1. A continuously variable change-speed gear comprising a rotating driving friction element and a rotatable driven friction element co-operating therewith, a conical friction surface on at least one of the elements engaged by the other element, means for moving one of the elements whilst maintaining the axis thereof perpendicular to a given plane, means for applying between the said elements a radial force proportional to the load, means for also applying between the said elements a second force also proportional to the load and acting in an axial direction, the said axial force being such, relatively to the radial force, that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

2. A continuously variable change-speed gear comprising a rotating driving friction element and a rotatable driven friction element co-operating therewith, a conical friction surface on at least one of the elements engaged by the other element, a pivotally mounted arm on which at least one of the said elements is mounted so as to be movable into and out of engagement with the other element, means for moving said element mounted on the pivotal arm in an axial direction, means for applying between the said elements a radial force proportional to the load, means for also applying between the said elements a second force also proportional to the load and acting in an axial direction, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

3. A continuously variable change-speed gear comprising a rotating driving friction element and a rotatable driven friction element co-operating therewith, a conical friction surface on at least one of the elements engaged by the other element, means for moving one of the elements whilst maintaining the axis thereof perpendicular to a given plane, means for applying between the said elements a radial force proportional to the load, at least one helical surface co-operating with one of the friction elements and rotatable relatively thereto for applying to the said element an axially directed force also proportional to the load, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

4. A continuously variable change-speed gear comprising a rotating driving friction element and a rotatable driven friction element co-operating therewith, a conical friction surface on at least one of the elements engaged by the other element, a pivotally mounted arm on which at least one of the said elements is mounted so as to be movable into and out of engagement with the other element, at least one helical surface co-operating with the element mounted on the pivotal arm and rotatable relatively thereto for applying to the said element an axially directed force proportional to the load, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

5. A continuously variable change-speed gear comprising a rotating driving friction element and a rotatable driven friction element co-operating therewith, a conical friction surface on at least one of the elements engaged by the other element, means for moving one of the elements whilst maintaining the axis thereof perpendicular to the given plane, a planet wheel rotating with the driven friction element, a sun wheel driven by the planet wheel, means for moving the axis of the driven friction element about the axis of the sun wheel, the said sun wheel acting through the driven friction element to produce between the said two elements a radial force proportional to the load, means for also applying between the said elements a second force also proportional to the load and acting in an axial direction, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

6. A continuously variable change-speed gear comprising a rotating driving friction element and a rotatable driven friction element co-operating therewith, a conical friction surface on at least one of the elements engaged by the other element, means for moving one of the elements whilst maintaining the axis thereof perpendicular to a given plane, a planet wheel rotating with the driven friction element, a sun wheel driven by the planet wheel, means for moving the axis of the driven friction element about the axis of the sun wheel, the said sun wheel acting through the driven friction element to produce between the said two elements a radial force proportional to the load, co-operating elements on the driven friction element and the planet wheel which exist between the two friction elements a force also proportional to the load and acting in an axial direction upon relative rotation of the said co-operating elements, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

7. A continuously variable change-speed gear comprising a rotating driving friction element and a rotatable driven friction element co-operating therewith, a conical friction surface on at least one of the elements engaged by the other element, means for moving one of the elements whilst maintaining the axis thereof perpendicular to a given plane, a planet wheel rotating with the driven friction element, a sun wheel driven by the planet wheel, means for moving the axis of the driven friction element about the axis of the sun wheel, the said sun wheel acting through the driven friction element to produce between the said two elements a radial force proportional to the load, at least one roller co-operating with at least one helical surface on the driven friction element and on the planet wheel which exert between the two friction elements a force also proportional to the load and acting in an axial direction upon relative rotation of the rollers and helical surfaces, the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

8. A continuously variable change-speed gear comprising a rotating conical driving friction element and a rotatable driven friction element co-operating therewith having a friction surface in the form of an annulus, means for moving one of the elements whilst maintaining the axis thereof perpendicular to a given plane, a planet wheel rotating with the driven friction element, a sun wheel driven by the planet wheel, means for moving the axis of the driven friction element about the axis of the sun wheel, the said sun wheel acting through the driven friction element to produce between the said two elements a radial force proportional to the load, at least one roller co-operating with at least one helical surface on the driven friction element and on the planet wheel which exert between the two friction elements a force also proportional to the load and acting in an axial direction upon relative rotation of the rollers and helical surfaces, the pitch of the said helical surfaces being such that the axial force is approximately equal to the force acting radially where the two friction elements engage multiplied by tan $\alpha$ (where $\alpha$=half the conical angle of the conical friction surface), the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

9. A continuously variable change-speed gear comprising a rotating conical driving friction element and a rotatable driven friction element co-operating therewith having a friction surface in the form of an annulus, a planet wheel rotating with the driven friction element, a sun wheel driven by the planet wheel, an arm pivotally mounted on the axis of the sun wheel and on which the driven friction element is mounted so as to be movable into and out of engagement with the driving friction element, the said sun wheel acting through the driven friction element to produce between the said two elements a radial force proportional to the load, at least one roller co-operating with at least one helical surface on the driven friction element and on the planet wheel which exert between the two friction elements a force also proportional to the load and acting in an axial direction upon relative rotation of the rollers and helical surfaces, the pitch of the said helical surfaces being such that the axial force is approximately equal to the force acting radially where the two friction elements engage multiplied by tan α (where α=half the conical angle of the conical friction surface), the said axial force being such relatively to the radial force that the resultant of the two forces acts in a direction normal to the conical friction surface where such surface engages the other element, even when the load is varying, and an independent external control for adjusting the gear ratio, whereby during the adjustment of the gear ratio by the said independent external control work is not directly expended against the said resultant force.

10. A continuously variable change-speed gear comprising a plurality of rotating driving friction elements and a plurality of rotatable driven friction elements co-operating therewith, a conical friction surface on at least one of each pair of co-operating elements, means for moving one of the elements of each pair in an axial direction, a planet wheel rotating with each of the driven friction elements, a sun wheel driven by all of the planet wheels, means for moving the axis of each driven friction element about the axis of the sun wheel, the said sun wheel acting through the driven friction elements to produce between each pair of elements a radial force proportional to the load, means for also applying between each pair of elements a second force also proportional to the load and acting in an axial direction, the said axial force being such relatively to the radial force that the resultant of the two forces acts in a direction normal to each conical friction surface where such surface engages the friction element co-operating therewith, even when the load is varying, and an independent external control for adjusting the gear ratio, whereby during the adjustment of the gear ratio by the said independent external control work is not directly expended against the said resultant force.

11. A continuously variable change-speed gear, as claimed in claim 10, having a drive common to the driving friction elements of all the pairs of co-operating elements.

PROSPER L'ORANGE.